United States Patent [19]
Gaudette et al.

[11] 3,904,668
[45] Sept. 9, 1975

[54] PROCESS FOR PREPARING IMINODIACETONITRILE AND ALKALI METAL IMINODIACETATES

[75] Inventors: Roger R. Gaudette; James E. Philbrook, both of Nashua; Jon C. Thunberg, Amherst, all of N.H.

[73] Assignee: W. R. Grace & Co., New York, N.Y.

[22] Filed: Nov. 15, 1973

[21] Appl. No.: 416,026

[52] U.S. Cl. .................. 260/465.5 A; 260/534 E
[51] Int. Cl.² ................................. C07C 120/00
[58] Field of Search .................... 260/465.5 A

[56] References Cited
UNITED STATES PATENTS

| | | |
|---|---|---|
| 2,511,487 | 6/1950 | Thompson .................. 260/465.5 A |
| 2,794,044 | 5/1957 | Miller ........................ 260/465.5 A |
| 3,167,580 | 1/1965 | Saunders et al. ............ 260/465.5 A |
| 3,412,137 | 11/1968 | Stutts ......................... 260/465.5 A |
| 3,463,811 | 8/1969 | Godfrey et al. .......... 260/465.5 A X |
| 3,534,080 | 10/1970 | Mejia et al. ............. 260/465.5 A X |
| 3,714,223 | 1/1973 | Godfrey et al. ............. 260/465.5 A |

*Primary Examiner*—Joseph P. Brust
*Attorney, Agent, or Firm*—Elton Fisher

[57] ABSTRACT

Iminodiacetonitrile is prepared by forming an aqueous mixture of hexamethylenetetramine, HCN, and glycolonitrile and passing the mixture through a tubular reactor at about 100°–200°C to form iminodiacetonitrile which is recovered. Alternatively the iminodiacetonitrile exit the tubular reactor is fed into an alkali metal hydroxide solution and hydrolyzed to alkali metal iminodiacetate.

30 Claims, No Drawings

PROCESS FOR PREPARING IMINODIACETONITRILE AND ALKALI METAL IMINODIACETATES

BACKGROUND OF THE INVENTION

This invention is in the field of iminodiacetonitrile (IDAN) preparation.

More particularly, this invention is directed to the continuous preparation of IDAN by continuously passing an aqueous mixture of hexamethylenetetramine (HMTA), HCN, and glycolonitrile through a tubular reactor (reaction zone) maintained at about 100°–200°C, and recovering the IDAN which is formed; or, alternatively, directly hydrolyzing the IDAN solution to alkali metal iminodiacetate.

Prior art processes for preparing IDAN are taught by the following U.S. Patents:

| Patent No. | Inventor(s) | Class |
|---|---|---|
| 2,442,547 | Mostek | 260/464 |
| 2,511,487 | Thompson | 260/465.5 |
| 2,794,044 | Miller | 260/465.5 |
| 3,167,580 | Saunders et al | 260/465.5 |
| 3,412,137 | Stutts | 260/465.5 |

U.S. Pat. No. 2,895,989 (Sexton, 260/534) teaches the conversion of IDAN to an alkali metal salt of iminodiacetic acid (IDA) by hydrolyzing the IDAN with an alkali metal hydroxide.

Until now, the most generally useful process for preparation of iminodioacetonitrile has been essentially that described by Miller (U.S. Pat. No. 2,794,044). He states, correctly, that:

"The obvious equation for the reaction producing iminodiacetonitrile is:

$$NH_3 + 2CH_2O + 2HCN \rightarrow HN(CH_2CN)_2 + 2H_2O$$

When, however, the reactants are mixed in the stoichiometric ratio demanded by this equation, no product can be isolated regardless of the pH adjustment. The following different equation expresses the stoichiometric ratios necessary to obtain the best yield, ca. 65%:

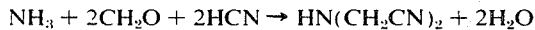
$$4NH_3 + 2CH_2O + 6HCN \xrightarrow{␣} 3HN(CH_2CN)_2 + NH_3 + 6H_2O.$$

Since $NH_3$ and $CH_2O$ in this ratio yields HMTA, and if $H_2SO_4$ is used to neutralize the $NH_3$ as it is formed, an equivalent equation would be:

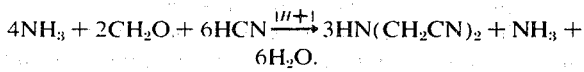
$$(CH_2)_6N_4 + 6HCN + \frac{1}{2} H_2SO_4 \rightarrow 3HN(CH_2CN)_2 + \frac{1}{2}(NH_4)_2SO_4$$

This equation illustrates several disadvantages of this method of IDAN manufacture; only three-fourths of the N in the HMTA is converted to IDAN, the remaining one-fourth is released as $NH_3$ (i.e. as $(NH_4)_2SO_4$). Consequently, the HMTA is not used efficiently. The release of $NH_3$ requires constant pH control by the addition of $H_2SO_4$. The product is thus a slurry of IDAN crystals in a liquor containing dissolved IDAN, HCN, other organic by-products, and large amounts of $(NH_4)_2SO_4$. In practice, this liquor cannot be recycled; it must, therefore, receive costly effluent treatment before it can be discharged.

We have discovered that IDAN can be prepared from HMTA, glycolonitrile, and HCN according to the following equation:

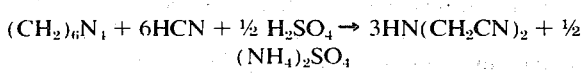
$$(CH_2)_6N_4 + 6HCN + 2HOCH_2CN \rightarrow 4HN(CH_2CN)_2 + 2H_2O$$

Such a procedure avoids the above problems. Since no $NH_3$ is released, all the HMTA is potentially available for conversion to IDAN and no $H_2SO_4$ is required. Thus, higher yields can be obtained and pH control is not needed. The process can therefore readily be made continuous. Furthermore, since the product is essentially pure IDAN with no inorganic contamination, the reaction mixture in its entirety can be hydrolyzed with alkali metal hydroxide to give $IDANa_2$. When this is done, the effluent problem is totally eliminated. If IDAN is the desired product, it can be crystallized from the reaction product. The resulting liquor would be free of $(NH_4)_2SO_4$ and, therefore, could be hydrolyzed with NaOH to give useful $IDANa_2$ without the production of sodium sulfate — an undesirable side product.

Where hydrolyzing IDAN to $IDANa_2$ (or $IDAK_2$) the ammonia which is produced is recovered. It (the ammonia) can be used as fertilizer (e.g., as ammonium sulfate or ammonium phosphate); alternatively, the recovered ammonia can be converted to HMTA and/or HCN and recycled into the process. Other uses for the recovered ammonia will be readily apparent to those skilled in the art.

Tubular reactors are well known to those skilled in the art. Their use is described in Canadian Pat. No. 829,333 (Davis et al., 260/464.8) and in the following U.S. Pats:

| Patent No. | Inventors | Class |
|---|---|---|
| 3,176,580 | Saunders et al | 260/465.5 |
| 3,463,805 | Morgan et al | 260/465.5 |
| 3,515,742 | Morgan et al | 260/465.5 |
| 3,607,930 | Berding et al | 260/534E |

SUMMARY OF THE INVENTION

In summary, this invention is directed to a process for preparing IDAN comprising admixing HMTA, water, HCN, and glycolonitrile in a mole ratio of HMTA to HCN to glycolonitrile of 1:5.2–6.6:1.8–2.2, passing the resulting aqueous mixture through a tubular reaction zone (tubular reactor) while maintaining the temperature within the tubular reacting zone at 50°–200°C, and recovering the IDAN from the aqueous mixture exit the tubular reaction zone; or, alternatively, directly hydrolyzing the IDAN solution exit the tubular reacting zone to alkali metal iminodiacetate.

DESCRIPTION OF PREFERRED EMBODIMENTS

In preferred embodiments of the process of the above Summary:

1. The aqueous system (mixture) prepared by admixing HMTA, HCN, water and glycolonitrile is prepared in a mixing and reacting zone by feeding HCN into an aqueous mixture of HMTA and $CH_2O$ in the mixing and reacting zone and maintaining the temperature within the mixing and reacting zone at 10°–50°C (more preferably 25°–35°C) until about one-fourth of the HCN has been added, thence cooling to 0°–30°C (more preferably 5°–15°C), and adding the remaining three-fourths of the HCN.

2. The temperature within the tubular reacting zone is 50°–200°C (more preferably 120°–140°C or 110°–140°C).
3. The mole ratio of HMTA to HCN to glycolonitrile is 1:5.7–6.3:1.8–2.2 (more preferably 1:6.0:2.0).
4. The pH of the aqueous system in the mixing and reacting zone is 4–10 (more preferably 7–9).
5. Residence time within the tubular reacting zone is 0.1–20 minutes (more preferably 0.5–5 minutes).
6. If IDAN is the desired product, the aqueous system exit the second reaction zone is cooled to 0°–40°C (more preferably to 15°–25°C) and the IDAN is separated therefrom.
7. If alkali metal iminodiacetate is the desired product, the hot aqueous solution of IDAN exit the second reaction zone is fed into aqueous alkali metal hydroxide solution at 40°–120°C. (more preferably 50°–60°C) to hydrolyze the IDAN to dialkali metal iminodiacetate. Contact time between the alkali metal hydroxide solution and the IDAN should be sufficient to hydrolyze the IDAN. The hydrolysis proceeds rapidly and contact times of a few minutes (e.g. 1–5 minutes) suffice; to be safe contact times of 15–30 minutes are frequently used where the temperature of the mixture being hydrolyzed is 50°–60°C.; however excellent results have been obtained with shorter and with longer contact times at temperatures ranging between 40° and 120°C.

In another preferred embodiment ("Embodiment A") this invention is directed to a process for preparing a dialkali metal iminodiacetate by a process comprising:
a. preparing an aqueous mixture of hexamethylenetetramine, HCN, and glycolonitrile having a mole ratio of hexamethylenetetramine to HCN, to glycolonitrile of 1:5.2–6.6:1.8–2.2 and passing said aqueous mixture through a tubular reaction zone while maintaining the temperature within the tubular reaction zone at 50°–200°C to form an aqueous intermediate product comprising iminodiacetonitrile and water;
b. admixing the aqueous intermediate product exit the tubular reaction zone with an aqueous alkali metal hydroxide solution in a hydrolysis zone said alkali metal hydroxide solution having a temperature of 30°–120°C, (preferably 40°–110°C). and containing an amount of the alkali metal hydroxide effective for hydrolyzing the iminodiacetonitrile component of the aqueous intermediate product to the dialkali metal iminodiacetate and ammonia; and
c. recovering the resulting aqueous dialkali metal iminodiacetate solution.

In especially preferred embodiments of the embodiment set forth in Embodiment A, supra:
1. The amount of dialkali metal hydroxide present in the aqueous alkali metal hydroxide solution is stoichiometric based on the iminodiacetonitrile content of the aqueous intermediate product.
2. The aqueous alkali metal hydroxide solution analyzes 10–30 (or 12–25%) alkali metal hydroxide.
3. The aqueous alkali metal hydroxide is sodium hydroxide.
4. The hydrolysis is conducted at 40°–110°C (preferably at 45°–60°C, and more preferably at about 50°C).
5. The mole ratio of hexamethylenetetramine to HCN to glycolonitrile is 1:5.2–6.6:1.8–2.2

6. The temperature within the mixing and reacting zone is 5°–15°C.
7. The temperature within the tubular reacting zone is 110°–140°C.
8. Residence time in the tubular reaction zone is 0.5–5 minutes.
9. Residence time in the hydrolysis zone is 5–30 minutes.
10. Water is evaporated from the aqueous dialkali metal iminodiacetate solution to precipitate dialkali metal iminodiacetate which is recovered.

DETAILED DESCRIPTION OF THE INVENTION

The following equations show the stoichiometry of the formation of IDAN and IDANa$_2$ from HMTA, HCN, glycolonitrile (the latter being derived from HCN and CH$_2$O), and NaOH:

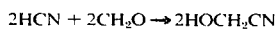

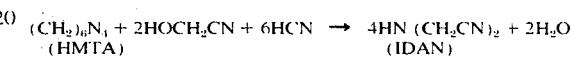

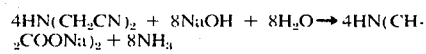

The process (or method) of the instant invention offers a convenient method for the continuous preparation of IDAN or IDANa$_2$ from HMTA, HCN, and CH$_2$O (or HMTA, HCN, and glycolonitrile).

The aqueous system (an aqueous mixture of HMTA, HCN, and glycolonitrile) which is reacted to form IDAN can be prepared in a mixing and reacting zone (as recited in Embodiment 1, under the heading "Description of Preferred Embodiments," supra) and passed from this zone to (and through) a tubular reactor (i.e. a tubular reacting (or reaction) zone).

If desired two (or more) mixing and reacting zones (arranged in parallel) can be used. In an operation using two mixing and reacting zones HMTA, water, HCN, and glycolonitrile (or HMTA, water, HCN, and formaldehyde) can be admixed in one (a first) mixing and reacting zone while feeding a previously prepared mixture from another (a second) mixing and reacting zone to and through the tubular reaction zone. When the second mixing and reacting zone becomes empty (or nearly empty) it can be replaced with the filled (or charged) first mixing and reaction zone and the mixture contained therein can be fed to (and through) the tubular reaction zone while preparing another lot of such mixture in the now empty (or nearly empty) second mixing and reacting zone. By feeding from one mixing and reacting zone while preparing a new lot of the mixture of HMTA, water, HCN, and glycolonitrile in the other mixing and reacting zone, continuous runs of long duration can be made without interrupting the feed to the tubular reaction zone.

In an alternative and equivalent procedure, an aqueous HMTA solution, anhydrous liquid HCN (or an aqueous HCN solution) and an aqueous solution of CH$_2$O or glycolonitrile can be continuously metered into the tubular reactor at rates to provide the reactants (HMTA, HCN, and glycolonitrile (or the HMTA and HCN and CH$_2$O precursors of the glycolonitrile)) in appropriate (usually about stoichiometric) mole ratios and at rates to provide the desired residence time in the tubular reactor.

Conveniently, the tubular reactor can be surrounded by a heat exchange medium (e.g., oil, Dowtherm, chlorinated hydrocarbons, or the like) maintained at a predetermined temperature. Alternatively, electrical heating can be used to maintain a predetermined temperature within the tubular reaction zone. Still other temperatures control methods will be readily apparent to those skilled in the art.

The temperature of the aqueous system in the mixing and reacting zone can be controlled via cooling coils therein, via a cooling jacket surrounding said zone, or by cooling coils and a jacket. Other methods for maintaining the desired temperature within said zone will be readily apparent to those skilled in the art.

The aqueous system exit the tubular reaction zone can be cooled by passing it (the aqueous system) through a heat exchanger or by placing it in a tank or vessel provided with cooling coils or a cooling jacket. Other methods for cooling said aqueous system will be readily apparent to those skilled in the art.

The IDAN product, which is a solid, can be separated from the cooled aqueous mixture (aqueous system) exit the tubular reactor by centrifugation, decantation, or filtration.

Alternatively the aqueous system exit the tubular reaction zone can be fed into an alkali metal hydroxide solution and hydrolyzed directly to alkali metal iminodiacetate.

Where operating at temperatures (in the tubular reactor) above about 100°C a pressure in excess of atmospheric (760 Torr) is maintained on the mixture (aqueous system) in the reaction zone to prevent excessive vaporization in the tubular reactor.

The weight ratio of water to reactants ((a) HMTA, glycolonitrile, and HCN; or (b) HMTA, formaldihyde, and HCN) has been varied over wide limits. Weight ratios of water to reactants as high as 10:1 have given excellent results, and excellent results have also been obtained where using just enough water to maintain a solution (a one phase system) in the mixing and reacting zone.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

An aqueous system was formed by admixing at about 10°C in a mixing and reacting zone: 1.0 mole of HMTA, 2.0 moles of glycolonitrile, and 6.0 moles of liquid anhydrous HCN. The HMTA was fed into the mixing zone as an aqueous solution analyzing 30% HMTA, and the glycolonitrile was fed into said zone as an aqueous solution analyzing 70% glycolonitrile. The resulting mixture, which had a pH of 8–10 at 10°C, was maintained at about 10°C while in the mixing zone. Said mixture was pumped through a ⅛ inch stainless tube (a tubular reaction zone) having a length of 10 meters. The tube was immersed in an oil bath having a temperature of 100°C which served as a heat exchange medium. Residence time in the tubular reactor (reaction zone) was 15 minutes. The product (aqueous system) exit the tubular reactor had a deep red-orange color. Said product was collected and weighed. An aliquot was removed and analyzed for IDAN. Conversion was 94.6% of theory.

EXAMPLE 2

Each of the runs reported in Table I was conducted using the general procedure of Example 1. Reaction temperature, residence time, color of the product exit the tubular reaction zone, and conversion (as percent of theory) for each of said runs are shown in said table

TABLE I

IDAN PREPARATION
CONVERSION, % OF THEORY, AT INDICATED TEMPERATURE

| Residence Time In Reaction Zone, Minutes | 80°C | 100°C | 120°C | 140°C | 160°C | 180°C |
|---|---|---|---|---|---|---|
| 0.33 | | | | 88.8(a) | 93.5(b) | 92.3(c) |
| 0.5 | | 51.2(d) | 78.2(e) | | | |
| 0.67 | | | | 93.2 | 93.9 | 92.3(f,l) |
| 1 | | 66.2(g) | 88.9(e) | 94.4(b) | 94.0(e,l) | 92.3(f,l) |
| 1.5 | | 76.6(h) | 89.9(e) | | | |
| 2 | | | 92.7(e) | | | |
| 2.5 | | | 93.8(e) | | | |
| 3 | | 84.8(e) | 94.2(e) | | | |
| 4 | | 88.3(e) | 94.8(b) | | | |
| 5 | 49.7(b) | | | | | |
| 6 | | 88.3(b) | | | | |
| 8 | | 91.0(b) | | | | |
| 10 | 59.3(i) | 92.5(k) | | | | |
| 12 | | 93.7(k) | | | | |
| 15 | 68(j) | | | | | |
| 20 | | 95.3(k) | | | | |

The following footnotes indicate the color of the aqueous system exit the tubular reaction zone for each run reported in the above table (Table I).

(a) Yellow-orange
(b) Deep orange
(c) Deep red
(d) Pale straw
(e) Orange
(f) Black
(g) Light Yellow
(h) Light orange
(i) Dark amber
(j) Very dark amber
(k) Red-orange
(l) Murky

EXAMPLE 3

Each of the runs reported in Table II was conducted using the general procedure of Example 1, except that the product exit the tubular reactor was hydrolyzed in about a stoichiometric amount of 20% NaOH at about 50°C. In each of said runs residence time in the reaction zone (tubular reactor) was 2 minutes and the reaction temperature was 130°C. The mole ratio of HMTA to glycolonitrile to HCN for each run is shown in said table. In each instance the resulting IDANa$_2$ solution was recovered, weighed, and analyzed for IDANa$_2$ and sodium nitrilotriacetate (NTANa$_3$) which is a side-product. Said Table II shows the NTA content of the product and conversion obtained in each run.

TABLE II

| | | | IDANa$_2$ PREPARATION | | | |
|---|---|---|---|---|---|---|
| Run No. | HMTA | HOCH$_2$CN | HCN | NTA Content of Product, %* | Glycine Content of Product, %* | Conversion % of Theory |
| 1 | 1.0 | 2.0 | 6.8 | 5.5 | 4.1 | — |
| 2 | 1.0 | 2.0 | 5.2 | 1.3 | 6.4 | 87.2 |
| 3 | 1.0 | 2.8 | 5.2 | 8.7 | 2.6 | 95.3 |
| 4 | 1.0 | 1.2 | 6.8 | 0.5 | 9.2 | 100 |
| 5 | 1.0 | 2.0 | 5.4 | 2.2 | 7.3 | 90.7 |
| 6 | 1.0 | 2.0 | 5.6 | 2.4 | 3.6 | 95.5 |
| 7 | 1.0 | 2.0 | 5.8 | 0.5 | 24.0 | 84.8 |

*Expressed as percent of total contained amino acid moieties on a dry basis.

EXAMPLE 4

The general procedure of Example 3 was repeated. However, in this instance the glycolonitrile was generated in situ by admixing a 30% HMTA solution, a 44% formaldehyde solution, and liquid anhydrous HCN at rates to provide a mole ratio of HMTA to glycolonitrile to HCN of 1:2:5.6 (a 5% deficency of HCN based on the above mentioned stoichiometry). Reaction temperature in the tubular reaction zone was 130°C and residence time therein was 2 minutes. Conversion was 88.5% of theory; the product contained 2.7% NTA (expressed as % of total contained amino acid moieties on a dry basis.

EXAMPLE 5

The general procedure of Example 4 was repeated. However, in this instance the HMTA:HCN:glycolonitrile (generated in situ) mole ratio was 1.0:6.0:2.0; reaction temperature was 120°C, and residence time in the tubular reactor was varied. The results are given in Table III.

TABLE III

| Residence Time, Minutes | % of HCN Reacted | Analysis Product, %* | | |
|---|---|---|---|---|
| | | Glycine | IDA | NTA |
| 1.05 | 92 | 9 | 84 | 7 |
| 1.50 | 97 | 9 | 90 | 1 |
| 2.0 | 98 | 8 | 92 | 0.3 |
| 2.5 | 98 | 8 | 92 | 0.3 |
| 3.0 | 99 | 8 | 92 | >0.1 |

*Expressed as percent of total contained amino moieties on a dry basis.

IDAN is an intermediate on a route to iminodiacetic acid (IDA) which can be prepared from IDAN by a method taught by Eschweiler (Ann. 1894, 278, 229–239). IDA is used in metal plating baths. German Pat. No. 1,034,946 (Chem. Abstracts 1960, 54, 16237e) teaches the use of IDA in cyanide-containing copper (and copper alloy) plating baths. The presence of IDA in such baths causes copper (or the copper alloy) to plate (precipitate) as a bright coating.

The use of IDA in the preservation of rubber latex is taught by British Pat. No. 800,089 (Chem. Abstracts 1959, 53, 2672i).

When heated in an aqueous medium with about a stoichiometric quantity of sodium hydroxide solution IDAN yields disodium iminodiacetate (IDANa$_2$) according to the following equation:

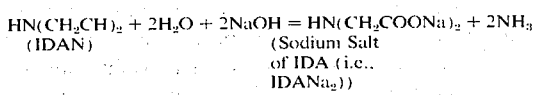

$HN(CH_2CH)_2 + 2H_2O + 2NaOH = HN(CH_2COONa)_2 + 2NH_3$
(IDAN)　　　　　　　　　(Sodium Salt of IDA (i.e., IDANa$_2$))

French Pat. No. 1,190,714 (Chem. Abstracts 1960, 54, 25993g) teaches the use of IDANa$_2$ as an agent for removing residual catalyst (e.g., Ti, Cr, Fe, V, or Al salts) from polyolefins.

As used herein the term "percent (%)" means parts per hundred and parts means parts by weight unless otherwise defined where used.

As used herein the term "mole" has its generally accepted meaning, i.e., a mole of a substance is that quantity which contains the same number of molecules of the substance as there are atoms in 12 grams of pure $^{12}C$.

As used herein:
"IDA" means iminodiacetic acid.
"IDAN" means iminodiacetonitrile.
"IDANa$_2$" means disodium iminodiacetate.
"HMTA" means hexamethylenetetramine.
"CH$_2$O" means formaldehyde.
"NTA" means nitrilotriacetic.
"NTANa$_3$" means trisodium nitrilotriacetate.
"NTAN" means nitrilotriacetonitrile.
"g" means gram or grams.
"mm" means millimeter or millimeters.
"Torr" means mm of mercury absolute, i.e., 760 Torr is one atmosphere.

"Percent conversion" and "percent yield" are dimensionless numbers. Conversion is one pass yield.

We claim:

1. a process for preparing iminodiacetonitrile comprising:

a. preparing an aqueous mixture of hexamethylenetetramine, HCN, and glycolonitrile having a mole ratio of hexamethylenetetramine to HCN to glycolonitrile of 1:5.2–6.6:1.8–2.2 by feeding the HCN into an aqueous mixture of the hexamethylenetetramine and formaldehyde in a mixing and reacting zone while maintaining the temperature within the mixing and reacting zone at 10°–50°C until one-fourth of the HCN is added and then adding the remaining three-fourths of the HCN while maintaining the temperature within the mixing and reacting zone at 0°–30°C, the pH of the aqueous mixture of hexamethylenetetramine, HCN, and glycolonitrile in the mixing and reacting zone being 4–10;

b. preparing an aqueous system containing the iminodiacetonitrile by passing the aqueous mixture of hexamethylenetetramine, HCN, and glycolonitrile through a tubular reaction zone while maintaining the temperature within the tubular reaction zone at 50°–200°C, residence time in the tubular reaction zone being 0.1–20 minutes, and c. recovering the iminodiacetonitrile exit the tubular reaction zone.

2. The process of claim 1 in which temperature within the mixing and reacting zone is maintained at 25°–35°C while adding the first one-fourth of the HCN thereto.

3. The process of claim 1 in which the temperature within the mixing and reacting zone is maintained at 5°–15°C while adding the remaining three-fourths of the HCN thereto.

4. The process of claim 1 in which the temperature within the tubular reaction zone is maintained at about 110°–140°C while passing the aqueous mixture of hexamethylenetetramine, HCN, and glycolonitrile through the tubular reaction zone.

5. The process of claim 1 in which the residence time in the tubular reaction zone is 0.5–5.5 minutes.

6. The process of claim 1 in which the pH of the aqueous mixture of hexamethylenetetramine, HCN, and glycolonitrile in the mixing and reacting zone is 7–9.

7. The process of claim 1 in which the aqueous system exit the tubular reaction zone is cooled to 0°–40°C to cause the iminodiacetonitrile to separate therefrom.

8. The process of claim 1 in which the mole ratio of hexamethylenetetramine to HCN to glycolonitrile is 1:5.7–6.3:1.8–2.2.

9. The process of claim 1 in which the mole ratio of hexamethylenetetramine to HCN to glycolonitrile is 1:6.0:2.0.

10. The process of claim 1 in which the preparation of iminodiacetonitrile is conducted in a continuous manner by preparing a first lot and a second lot of the aqueous mixture of hexamethylenetetramine, HCN, and glycolonitrile, passing the first lot of said mixture through the tubular reaction zone, and then preparing a third lot of said mixture while passing the second lot of said mixture through the tubular reaction zone.

11. A process for preparing iminodiacetonitrile comprising:

a. preparing an aqueous mixture of hexamethylenetetramine, HCN, and glycolonitrile in a mixing and reacting zone, said aqueous mixture having a mole ratio of hexamethylenetetramine to HCN to glycolonitrile of 1:5.2–6.6:1.8–2.2 by feeding the HCN into an aqueous mixture of the hexamethylenetetramine and formaldehyde in the mixing and reacting zone while maintaining the temperature within said zone at 0°–30°C, the pH of the aqueous mixture of hexamethylenetetramine, HCN, and glycolonitrile in the mixing and reacting zone being 4–10;

b. preparing an aqueous system containing the iminodiacetonitrile by passing the aqueous mixture of hexamethylenetetramine, HCN, and glycolonitrile through a tubular reaction zone while maintaining the temperature within the tubular reaction zone at 50°–200°C, residence time in the tubular reacting zone being 0.1–20 minutes; and c. recovering the iminodiacetonitrile exit the tubular reaction zone.

12. The process of claim 11 in which the temperature within the mixing and reacting zone is 5°–15°C.

13. The process of claim 11 in which the mole ratio of hexamethylenetetramine to HCN to glycolonitrile is 1:5.7–6.3:1.8–2.2.

14. The process of claim 11 in which the temperature within the tubular reaction zone is 110°–140°C.

15. The process of claim 11 in which the residence time in the tubular reaction zone is 0.5–5 minutes.

16. The process of claim 11 in which the mole ratio of hexamethylenetetramine to HCN to glycolonitrile is 1:5.7–6.3:1.8–2.2 and the temperature within the mixing and reacting zone is 5°–15°C.

17. The process of claim 16 in which the temperature within the tubular reaction zone is 110°–140°C.

18. The process of claim 17 in which the residence time in the tubular reaction zone is 0.5–5 minutes.

19. The process of claim 11 in which the mole ratio of hexamethylenetetramine to HCN to glycolonitrile is 1.0:6.0:2.0.

20. The process of claim 11 in which the pH of the aqueous mixture in the mixing and reacting zone is 7–9.

21. A process for preparing iminodiacetonitrile comprising:

a. preparing an aqueous mixture of hexamethylenetetramine, HCN, and glycolonitrile having a mole ratio of hexamethylenetetramine to HCN to glycolonitrile of 1:5.2–6.6:1.8–2.2 by feeding the HCN into an aqueous mixture of the hexamethylenetetramine and glycolonitrile in a mixing zone while maintaining the temperature within said zone at 10°–50°C, the pH of the aqueous mixture of hexamethylenetetramine, HCN, and glycolonitrile in the mixing zone being 4–10;

b. preparing an aqueous system containing the iminodiacetonitrile by passing the aqueous mixture of hexamethylenetetramine, HCN, and glycolonitrile through a tubular reaction zone while maintaining the temperature within the tubular reaction zone at 50°–200°C, residence time in the tubular reaction zone being 0.1–20 minutes, and (c) recovering the iminodiacetonitrile exit the tubular reaction zone.

22. The process of claim 21 in which temperature within the mixing and reacting zone is maintained at 25°–35°C while adding the first one-fourth of the HCN thereto.

23. The process of claim 21 in which the temperature within the mixing and reacting zone is maintained at 5°–15°C while the remaining three-fourths of the HCN is added thereto.

24. The process of claim 21 in which the temperature within the tubular reaction zone is maintained at about 110°–140°C while passing the aqueous mixture of hexamethylenetetramine, HCN, and glycolonitrile through the tubular reaction zone.

25. The process of claim 21 in which the residence time in the tubular reaction zone is 0.5–5.5 minutes.

26. The process of claim 21 in which the pH of the aqueous mixture of hexamethylenetetramine, HCN, and glycolonitrile in the mixing zone is 7–9.

27. The process of claim 21 in which the aqueous system exit the tubular reaction zone is cooled to 0°–40°C to cause the iminodiacetonitrile to separate therefrom.

28. The process of claim 21 in which the mole ratio of hexamethylenetetramine to HCN to glycolonitrile is 1:5.7–6.3:1.8–2.2.

29. The process of claim 21 in which the mole ratio of hexamethylenetetramine to HCN to glycolonitrile is 1:6.0:2.0.

30. The process of claim 21 in which the preparation of iminodiacetonitrile is conducted in a continuous manner by preparing a first lot and a second lot of the aqueous mixture of hexamethylenetetramine, HCN, and glycolonitrile, passing the first lot of said mixture through the tubular reaction zone, and then preparing a third lot of said mixture while passing the second lot of said mixture through the tubular reaction zone.

* * * * *